(12) United States Patent
Mohtar et al.

(10) Patent No.: US 10,859,097 B2
(45) Date of Patent: Dec. 8, 2020

(54) METHOD FOR CONTROLLING A TRIM-ADJUSTMENT MECHANISM FOR A CENTRIFUGAL COMPRESSOR

(71) Applicant: Honeywell International Inc., Morris Plains, NJ (US)

(72) Inventors: Hani Mohtar, Lorraine (FR); Ludek Pohorelsky, Otnice (CZ); Peter Davies, Lorraine (FR); Stephane Pees, Meurthe-et-Moselle (FR)

(73) Assignee: Garrett Transportation I Inc., Torrance, CA (US)

( * ) Notice: Subject to any disclaimer, the term of this patent is extended or adjusted under 35 U.S.C. 154(b) by 292 days.

(21) Appl. No.: 15/925,713

(22) Filed: Mar. 19, 2018

(65) Prior Publication Data

US 2019/0285086 A1 Sep. 19, 2019

(51) Int. Cl.
*F04D 29/46* (2006.01)
*F01D 17/16* (2006.01)
(Continued)

(52) U.S. Cl.
CPC ........ *F04D 29/464* (2013.01); *F01D 17/165* (2013.01); *F04D 15/0083* (2013.01); *F04D 27/0253* (2013.01); *F04D 29/284* (2013.01); *F04D 29/4206* (2013.01); *F04D 29/563* (2013.01); *F05D 2220/40* (2013.01); *F05D 2250/51* (2013.01); *F05D 2260/821* (2013.01); *F05D 2270/44* (2013.01)

(58) Field of Classification Search
CPC .. F04D 29/464; F04D 29/284; F04D 29/4206; F04D 29/563; F04D 15/0083; F04D 27/0253; F01D 17/165; F05D 2220/40; F05D 2250/51; F05D 2270/44; F05D 2260/821
USPC ............................................ 137/47, 55, 58
See application file for complete search history.

(56) References Cited

U.S. PATENT DOCUMENTS 4,122,668 A 10/1978 Chou et al.
5,306,116 A * 4/1994 Gunn ...................... F04D 27/02
415/17
(Continued)

FOREIGN PATENT DOCUMENTS

DE 102008028298 A1 12/2009
DE 102010026176 A1 1/2012
(Continued)

*Primary Examiner* — Moshe Wilensky
*Assistant Examiner* — Joshua R Beebe
(74) *Attorney, Agent, or Firm* — John C. James

(57) ABSTRACT

A method for controlling an inlet-adjustment mechanism in an air inlet for a compressor so as to switch the mechanism in a binary fashion between open and closed positions for adjusting a flow area of the inlet. The method includes identifying a threshold line on a compressor map of pressure ratio versus corrected flow rate for the compressor, at which the inlet-adjustment mechanism is switched from one of its positions to the other. A fixed switch band straddling the threshold line can be used for determining when to initiate the switch of positions so as to time the switch to coincide with the operating point reaching the threshold line. Alternatively, a time to reach the threshold line can be instantaneously computed and compared to the actuator/mechanism response time.

4 Claims, 9 Drawing Sheets

(51) Int. Cl.
*F04D 15/00* (2006.01)
*F04D 27/02* (2006.01)
*F04D 29/28* (2006.01)
*F04D 29/42* (2006.01)
*F04D 29/56* (2006.01)

(56) References Cited

U.S. PATENT DOCUMENTS

| | | | | |
|---|---|---|---|---|
| 6,463,380 B1* | 10/2002 | Ablett | ............... | F02C 9/00 |
| | | | | 123/674 |
| 2009/0317260 A1* | 12/2009 | Mirsky | ............... | F01D 15/08 |
| | | | | 417/29 |
| 2012/0328410 A1* | 12/2012 | Narayanan | ............ | F04D 27/001 |
| | | | | 415/1 |
| 2014/0308110 A1 | 10/2014 | Houst et al. | | |
| 2018/0320598 A1* | 11/2018 | Lamarre | ............... | F01D 17/04 |
| 2018/0371936 A1* | 12/2018 | Price | ............... | F02C 9/28 |
| 2019/0078586 A1* | 3/2019 | Zeng | ............... | F04D 29/462 |

FOREIGN PATENT DOCUMENTS

| | | | |
|---|---|---|---|
| DE | 102011121996 B4 | 6/2013 | |
| DE | 102012011423 B3 | 11/2013 | |
| DE | 102013003418 A1 | 8/2014 | |
| GB | 957884 A | 5/1964 | |
| JP | 3719337 B2 | 9/2005 | |
| WO | 2013074503 A1 | 5/2013 | |
| WO | 2016041024 A2 | 3/2016 | |

\* cited by examiner

METHOD FOR CONTROLLING A TRIM-ADJUSTMENT MECHANISM FOR A CENTRIFUGAL COMPRESSOR

BACKGROUND OF THE INVENTION

The present disclosure relates to centrifugal compressors, such as used in turbochargers, and more particularly relates to centrifugal compressors in which the effective inlet area or diameter can be adjusted for different operating points.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

One scheme for shifting the surge line of a centrifugal compressor to the left (i.e., surge is delayed to a lower flow rate at a given pressure ratio) and for shifting the choke flow line to the right (i.e., choke flow increases to a higher flow rate at a given pressure ratio) is to employ a trim-adjustment mechanism in the compressor inlet. Applicant is the owner of co-pending applications disclosing various trim-adjustment mechanisms of this type, see, e.g., application Ser. Nos. 14/537,339; 14/532,278; 14/642,825; 14/573,603; and 14/551,218; the entire disclosures of said applications being hereby incorporated herein by reference.

The present disclosure relates to methods for controlling such a trim-adjustment mechanism.

BRIEF SUMMARY OF THE DISCLOSURE

The present disclosure describes a method for controlling an inlet-adjustment mechanism in an air inlet for a compressor so as to switch the mechanism in a binary fashion between a closed position and an open position. In the closed position, the flow area of the inlet is reduced relative to that in the open position of the mechanism. The method includes identifying a threshold line on a compressor map of pressure ratio PR versus corrected flow rate Wc for the compressor. The threshold line is a line at which the inlet-adjustment mechanism is to be moved from the open position to the closed position when an operating point of the compressor on the compressor map reaches the threshold line under a condition of quasi-static movement of the operating point, starting from a high-flow side of the threshold line. In accordance with one embodiment, the method includes the steps of:

tracking, by detecting at periodic time intervals, movement of an operating point of the compressor on the compressor map;

determining, at each said time interval, whether the operating point is on the high-flow side of the threshold line or is on a low-flow side of the threshold line;

determining, at each said time interval, whether the operating point is moving toward the threshold line; and when the operating point is determined to be on the high-flow side of the threshold line and to be moving toward the threshold line, initiating actuation of the inlet-adjustment mechanism to switch from the open position to the closed position, wherein said initiating is begun before the operating point reaches the threshold line.

When the operating point is determined to be on the low-flow side of the threshold line and to be moving toward the threshold line, the method comprises initiating actuation of the inlet-adjustment mechanism to switch from the closed position to the open position before the operating point reaches the threshold line.

In accordance with the invention, there are various techniques by which the switch from open to closed, or from closed to open, can be "anticipated" before the operating point actually reaches the threshold line. In all cases, the objective is to time the switch so that, taking into account the time lag associated with moving the mechanism from one position to the other, the mechanism reaches the new position substantially when the operating point reaches the threshold line. One such technique entails identifying a high-switch line on the compressor map, the high-switch line being spaced from the threshold line on the high-flow side thereof, and identifying a low-switch line on the compressor map, the low-switch line being spaced from the threshold line on the low-flow side thereof. Then, the steps of initiating actuation of the inlet-adjustment mechanism to switch from the open position to the closed position, and to switch from the closed position to the open position, are based in part on where the operating point is located in relation to the high-switch line and in relation to the low-switch line, respectively.

For example, suppose the operating point is moving from a region of the compressor map at relatively high flow, with the inlet-adjustment mechanism in the open position, and is moving toward and predicted to reach the threshold line. In this case, the initiation of actuation of the mechanism is begun when the operating point crosses the high-switch line, which is positioned based in part on the maximum anticipated rate of movement of the operating point on the map, as well as the response time of the actuator and inlet-adjustment mechanism. Accordingly, even when the operating point is moving toward the threshold line at said maximum rate, the switch to the closed position will not occur too late.

Those skilled in the art will then readily appreciate that in the case of an electrically driven turbocharger (a so-called "e-turbo"), the distance between the low-switch line and the high-switch line (denoted herein as the "switch band") must be relatively larger than in the case of a traditional turbocharger driven by an exhaust-gas-driven turbine. This is because an e-turbo is capable of accelerating and decelerating at a faster rate than a traditional turbocharger.

In one embodiment of the invention, the step of determining whether the operating point is moving toward the threshold line comprises calculating a time rate of change of speed of the turbocharger, $\Delta Nt/\Delta t$, and using said time rate of change together with a result from the step of determining whether the operating point is on the high-flow side of the threshold line or is on the low-flow side of the threshold line. For example, if the time rate of change is negative (i.e., the turbocharger is decelerating, and the operating point is on the high-flow side of the threshold line, then the operating point is moving toward the threshold line. On the other hand, if the time rate of change of turbo speed is positive (acceleration), and the operating point is on the high-flow side, then the operating point is moving away from the threshold line.

Instead of using the time rate of change of turbocharger speed, the method can use the time rate of change of speed of the internal combustion engine, $\Delta Ne/\Delta t$, together with a result from the step of determining whether the operating point is on the high-flow side of the threshold line or is on the low-flow side of the threshold line.

As noted, the high-switch line can be spaced from the threshold line by an amount that is based in part on a response time Tr required for moving the inlet-adjustment mechanism from the open position to the closed position. Similarly, the low-switch line can be spaced from the threshold line by an amount that is based in part on the response time Tr.

In one embodiment of the invention, the method further comprises steps of:

at each said time interval, calculating a time rate of change of speed of the engine, $\Delta Ne/\Delta t$ (or alternatively a time rate of change of speed of the turbocharger, $\Delta Nt/\Delta t$; yet another alternative is to use a time rate of change of compressor corrected flow rate, $\Delta Wc/\Delta t$);

at each said time interval, calculating a distance D between the operating point and the threshold line on the compressor map;

at each said time interval, calculating, based on said distance D and said time rate of change, a time period $T_{TL}$ it will take for the operating point to reach the threshold line; and at each said time interval, making a comparison between said time period $T_{th}$ and the known response time Tr for the inlet-adjustment mechanism to transition between the open and closed positions;

wherein the step of initiating actuation of the inlet-adjustment mechanism is performed based on said comparison.

As an example, in one embodiment the step of initiating actuation of the inlet-adjustment mechanism is performed when said time period $T_{TL}$ is approximately equal to the response time Tr. The objective is similar to that of the embodiment using the low-switch line and the high-switch line, namely, to time the switch so that, taking into account the response time associated with moving the mechanism from one position to the other, the mechanism reaches the new position substantially when the operating point reaches the threshold line.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 1:
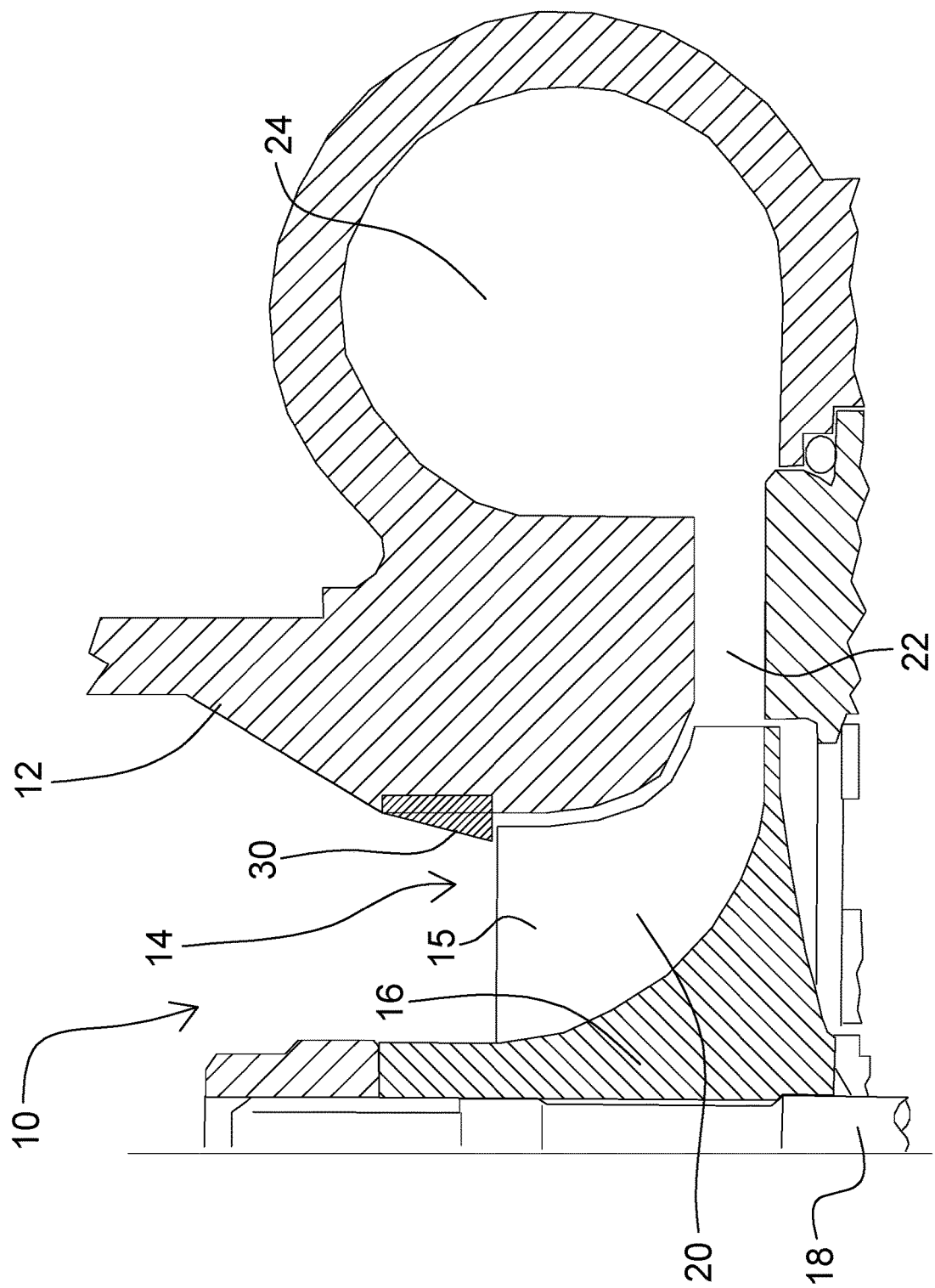
FIG. 1 is a diagrammatic depiction of a compressor having an inlet-adjustment mechanism, wherein the inlet-adjustment mechanism is in a closed position.
Figure 2:
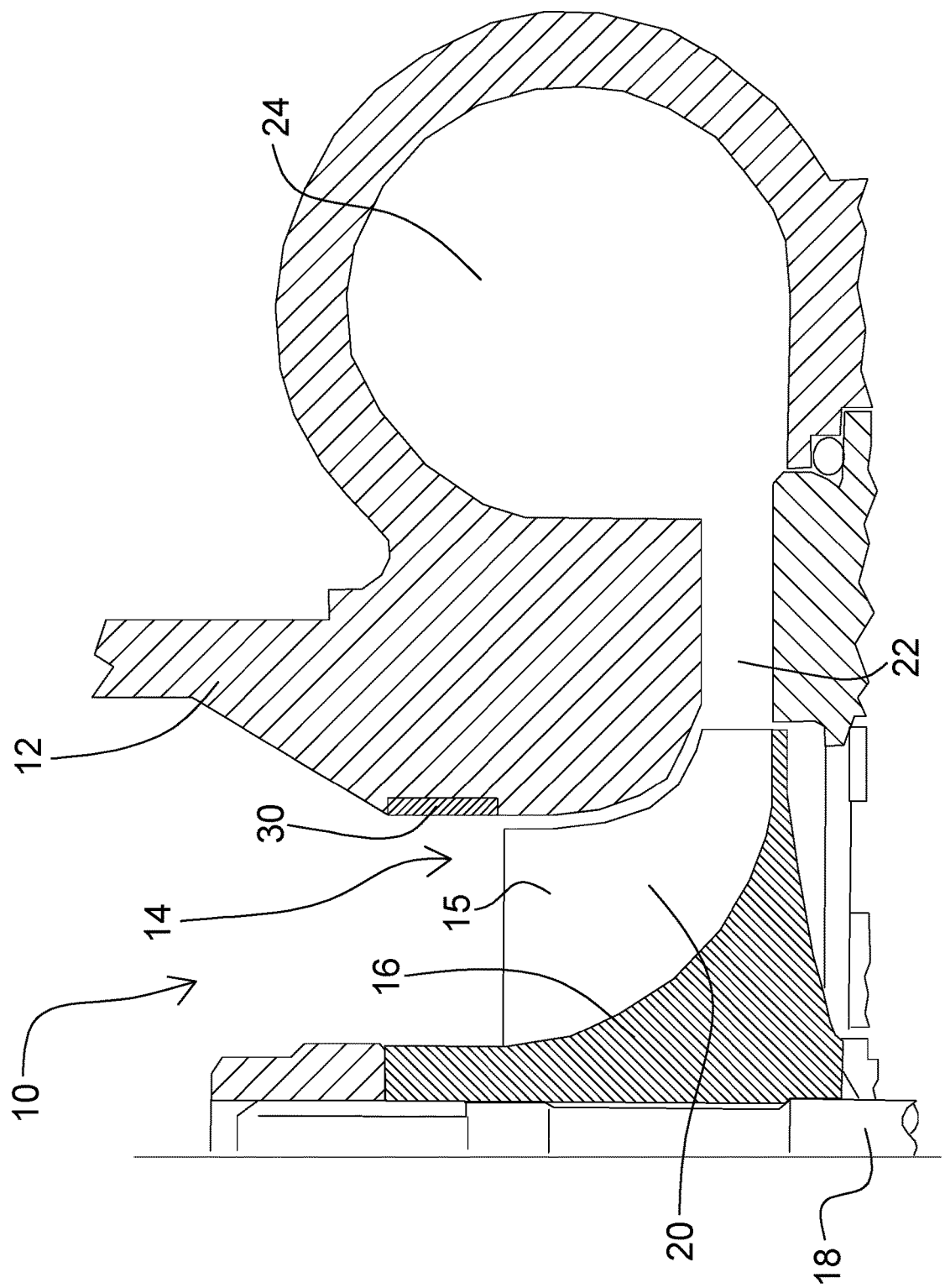
FIG. 2 is similar to FIG. 1 but shows the inlet-adjustment mechanism in an open position.
Figure 3:
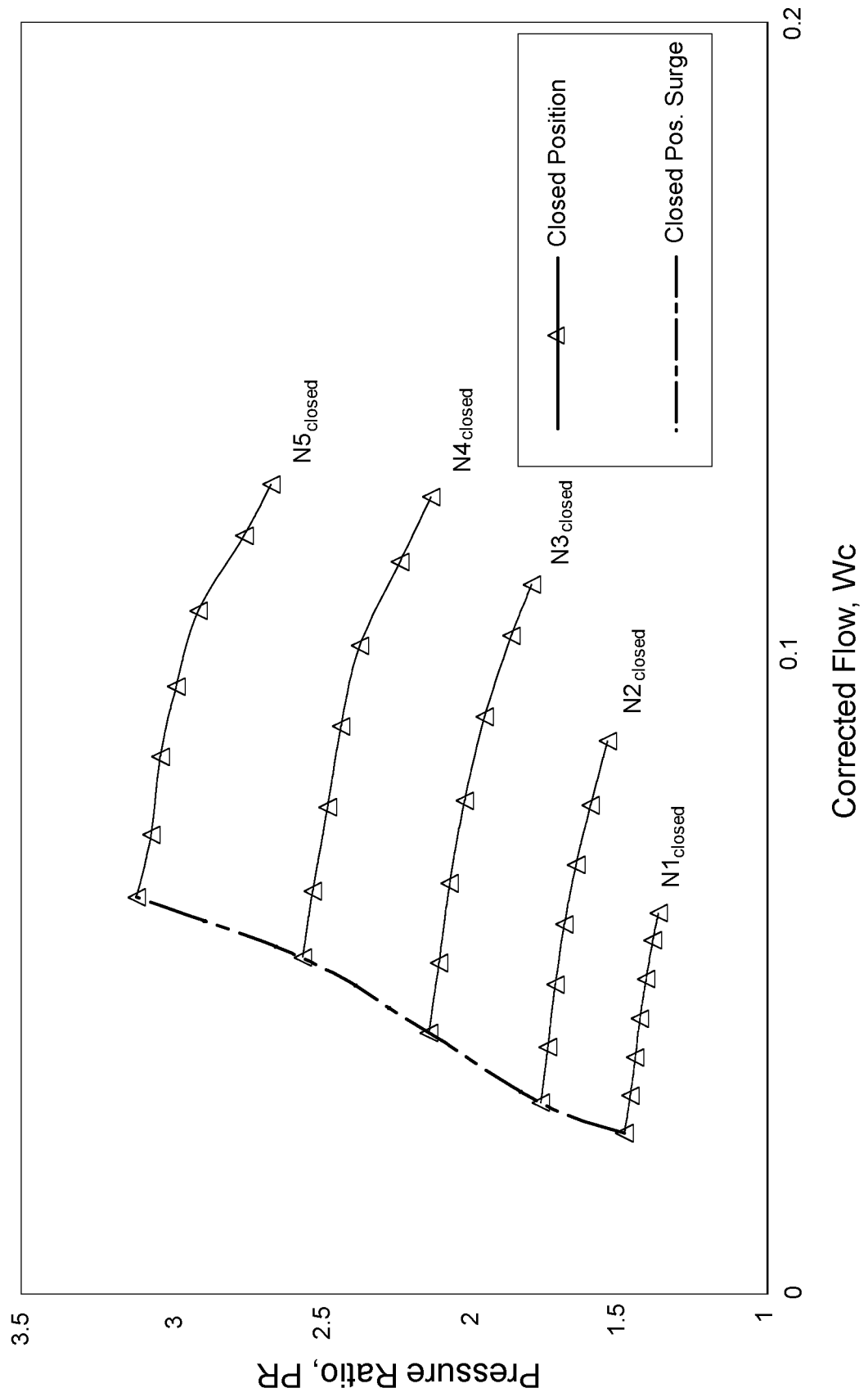
Figure 4:
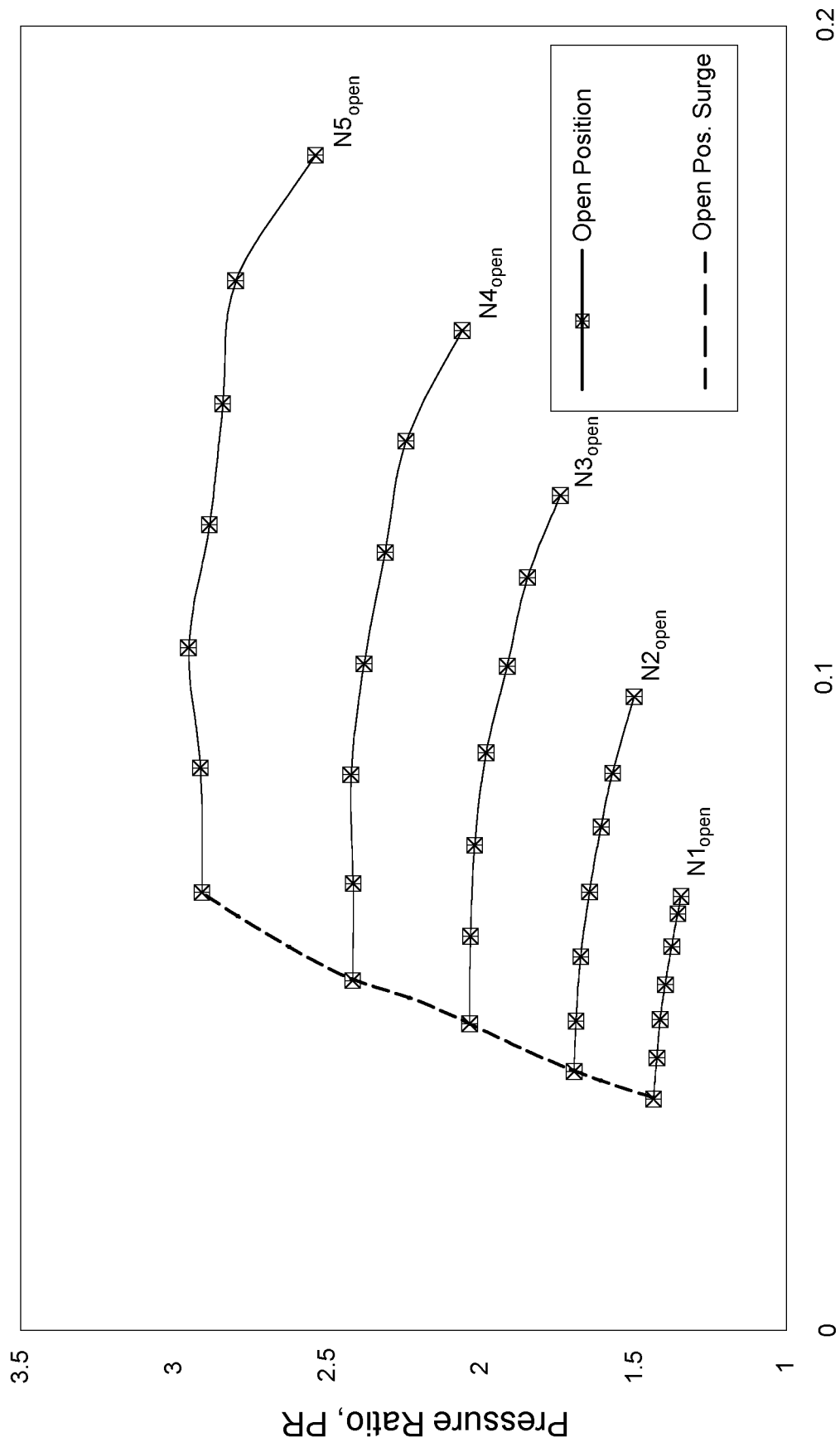
Figure 5:
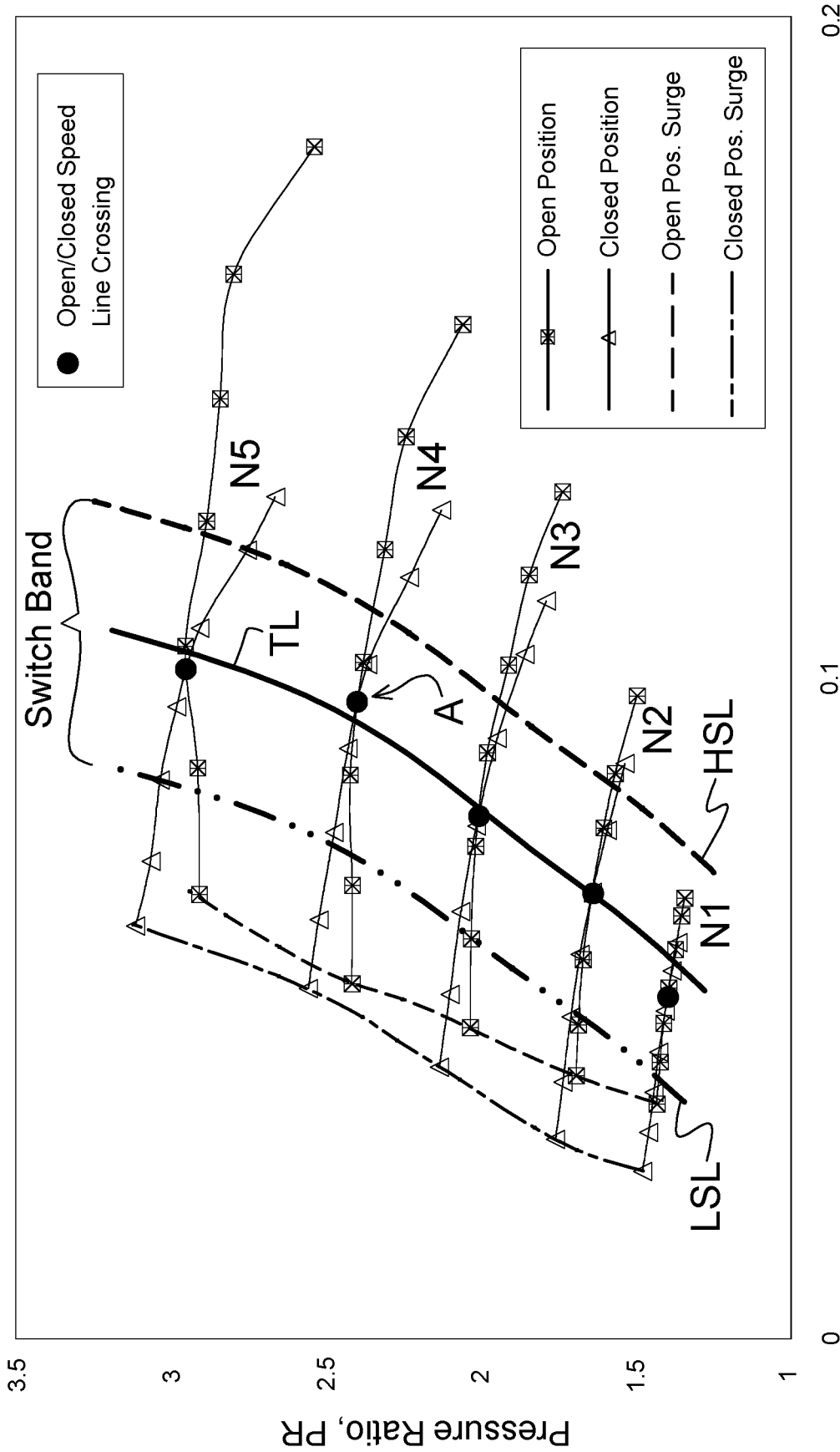
Figure 6:
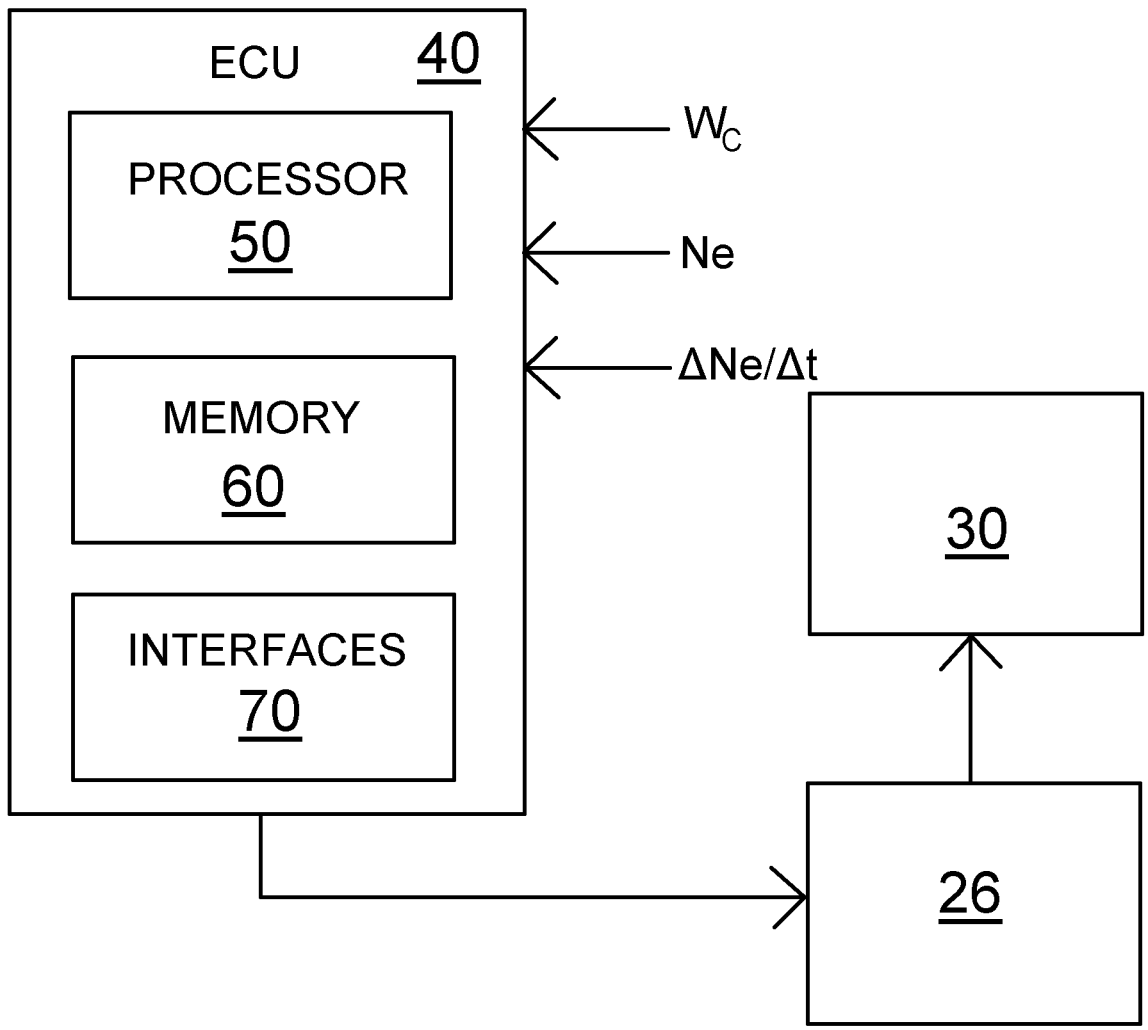
Figure 7:
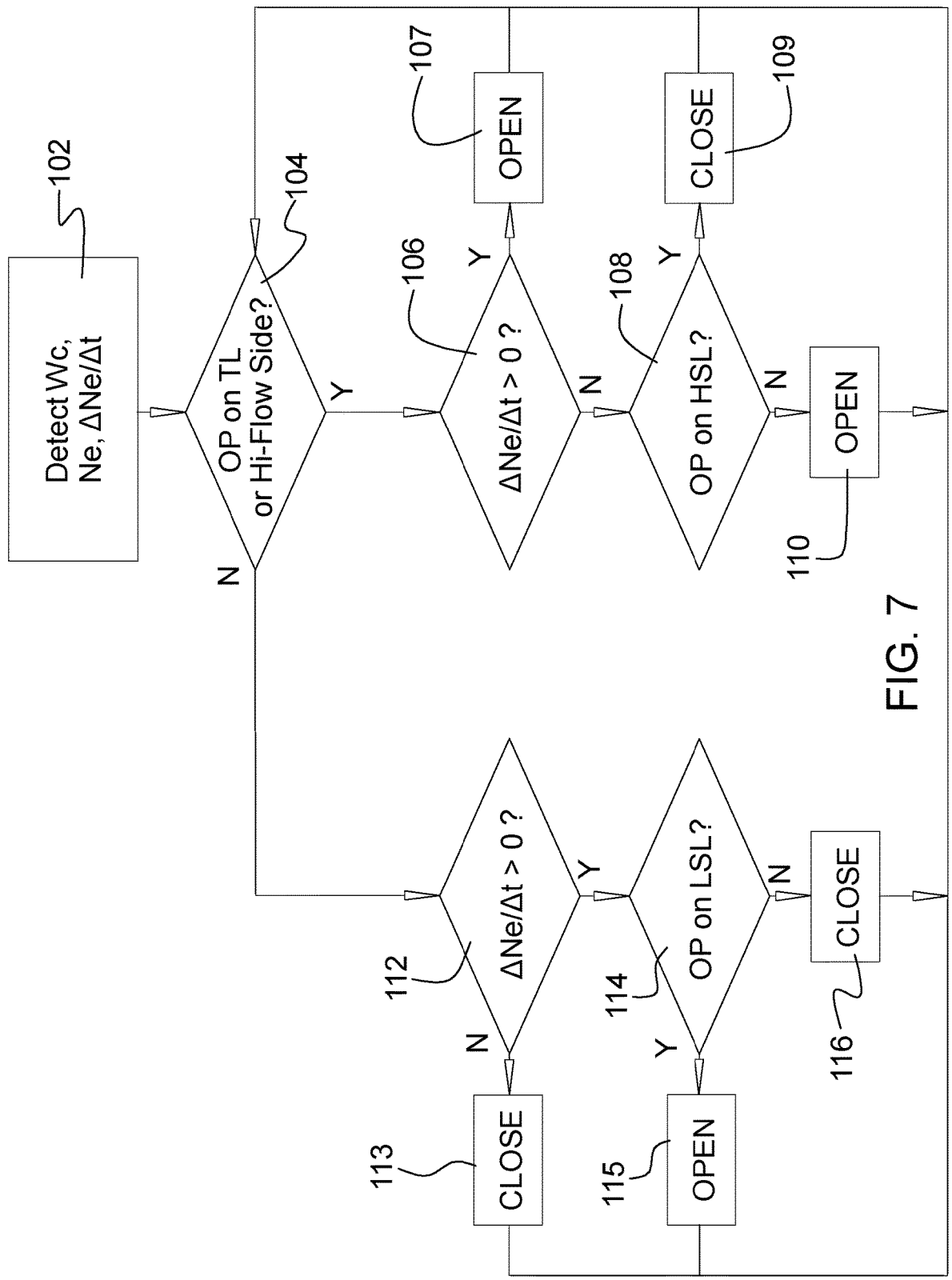
Figure 8:
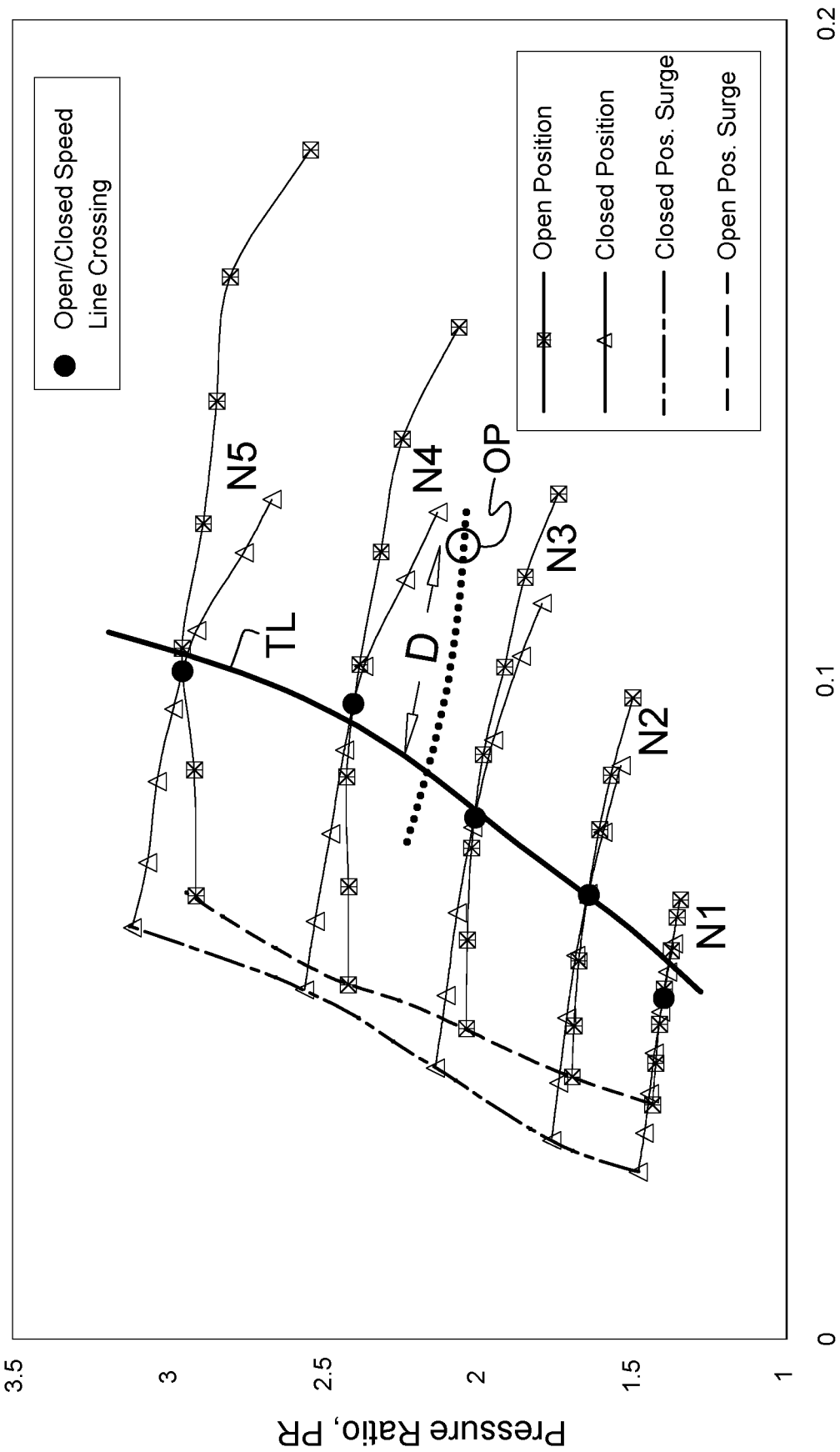
Figure 9:
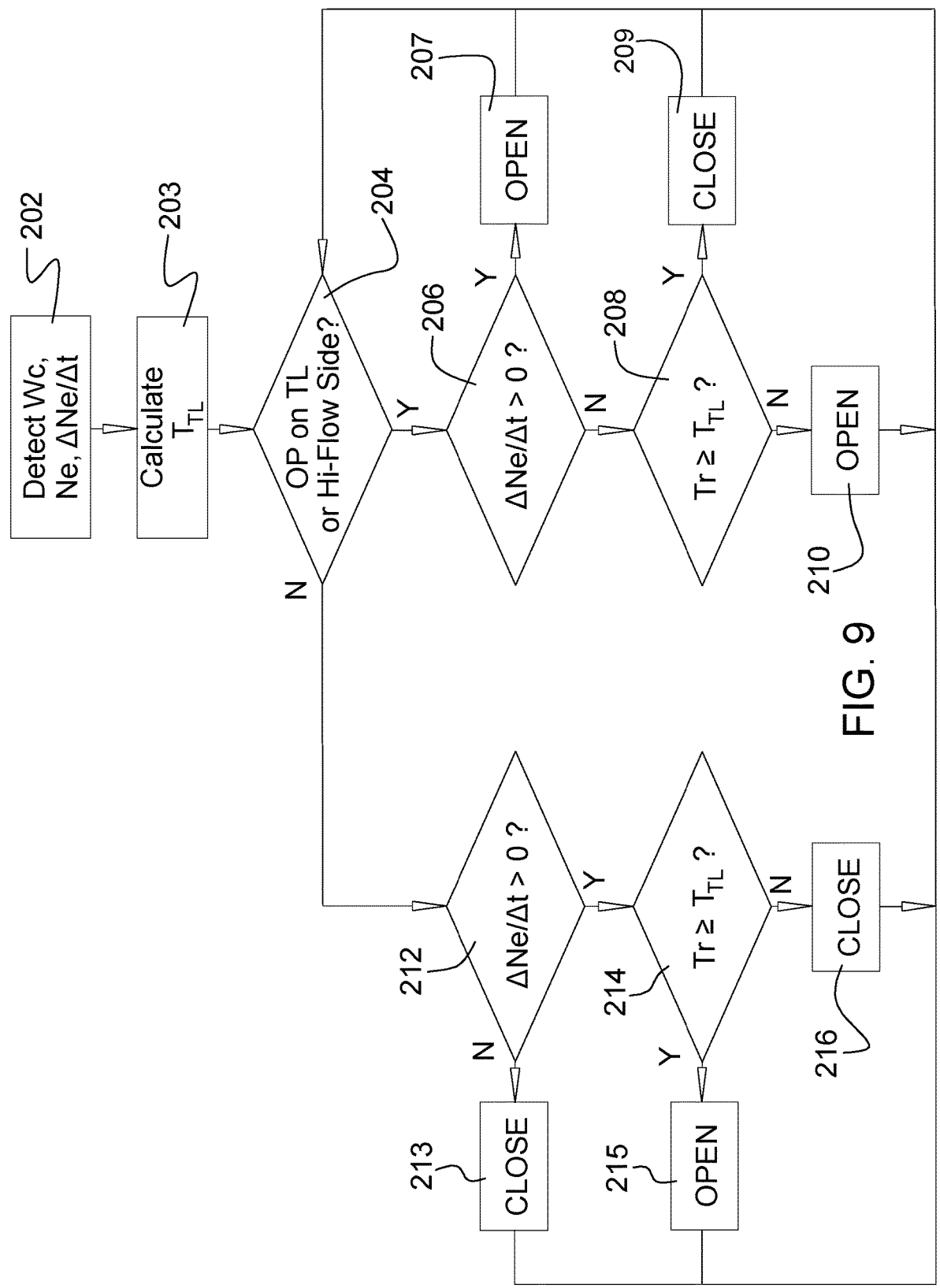

FIG. 3 schematically depicts a compressor map with the inlet-adjustment mechanism in the closed position corresponding to FIG. 1;

FIG. 4 schematically depicts a compressor map with the inlet-adjustment mechanism in the open position corresponding to FIG. 2;

FIG. 5 depicts a compressor map on which is identified a threshold line on which the inlet-adjustment mechanism is switched between its open and closed positions, and illustrating a low-switch line offset on a low-flow side of the threshold line, and a high-switch line offset on a high-flow side of the threshold line, in accordance with one embodiment of the invention;

FIG. 6 is a diagrammatic illustration of an engine control unit (ECU) in communication with an actuator that actuates the inlet-adjustment mechanism to move between the open and closed positions;

FIG. 7 is a flow chart illustrating a method in accordance with one embodiment of the invention, utilizing the low-switch and high-switch lines as depicted in FIG. 5;

FIG. 8 is a view of a compressor map similar to FIG. 5, but illustrating another embodiment of the invention in which an elapsed time until the operating point reaches the threshold line, $T_{TL}$, is instantaneously calculated and is compared to a response time for the inlet-adjustment mechanism to switch from one position to the other; and FIG. 9 is a flow diagram illustrating a method in accordance with the embodiment of the invention utilizing the instantaneously calculated time $T_{TL}$.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A compressor 10 in accordance with one embodiment of the invention is illustrated in cross-sectional view in FIGS. 1 and 2. The compressor 10 comprises a compressor housing 12 that defines an air inlet 14 extending along an axial direction of the compressor. A compressor wheel 15, comprising a hub 16 from which a plurality of blades 20 extend generally radially outwardly, is disposed in the compressor housing and is affixed to one end of a shaft 18 that is rotatably driven in a suitable manner (e.g., by an exhaust gas-driven turbine, not shown) for rotatably driving the compressor wheel 15. The compressor housing defines a diffuser 22 for receiving and diffusing air that is compressed as it passes through the compressor wheel. The diffuser delivers the diffused compressed air into a volute 24 defined by the compressor housing.

In accordance with the invention, the compressor of the turbocharger includes an inlet-adjustment mechanism 30 disposed in the air inlet 14 of the compressor housing and movable between a closed or "low-trim" position (FIG. 1) and an open or "high-trim" position (FIG. 2). The movement of the mechanism 30 can entail axial sliding, pivotal movement, or helicoidal (screw-type) movement of the mechanism, to name a few non-limiting examples. The details of the structure and operation of the inlet-adjustment mechanism 30 are not pertinent to the present disclosure, and any mechanism that operates to effectively alter the flow area of the air inlet 14 leading into the compressor wheel 15 can be employed in the practice of the present invention.

The inlet-adjustment mechanism 30 enables adjustment of the effective size or diameter of the inlet into the compressor wheel 15. As illustrated in FIG. 2, when the inlet-adjustment mechanism is in the high-trim or open position, the effective diameter of the inlet into the compressor wheel is relatively increased compared to the effective diameter in the low-trim or closed position of FIG. 1. In order for this effect to be achieved, the axial spacing distance from the mechanism 30 to the compressor wheel must be as small as practicable.

At intermediate and high flow rates, the inlet-adjustment mechanism 30 can be placed in the high-trim position as in FIG. 2. This can have the effect of increasing the effective inlet diameter and thus of reducing the flow velocity into the compressor wheel. FIG. 4 illustrates an exemplary compressor map for the high-trim position of FIG. 2. The map is in the form of compressor pressure ratio (discharge pressure divided by inlet pressure) versus corrected flow rate (e.g., mass flow rate corrected to standard temperature and pressure inlet conditions). The map includes a series of constant-speed lines $N1_{open}$, $N2_{open}$, $N3_{open}$, $N4_{open}$, and $N5_{open}$ at each of which the compressor rotational speed is held constant while corrected flow and pressure ratio vary. The map includes a high-trim surge line, which is the locus of points at which surge of the compressor is imminent; i.e., if the flow were reduced at the same pressure ratio, or the pressure ratio were increased at the same flow, the compressor would experience surge.

At low flow rates, the inlet-adjustment mechanism 30 can be placed in the low-trim position of FIG. 1. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate). This is illustrated in FIG. 3, showing the compressor map for the low-trim position. The low-trim map has the same values of speed lines. That is, the value of $N1_{closed}$ is equal to the value of $N1_{open}$, and the same is true for the other speeds.

In accordance with the invention, the compressor maps of FIGS. 3 and 4 can be based on test data for the compressor operated with the inlet-adjustment mechanism respectively in the closed position and in the open position. Alternatively, the compressor maps can be based on model-predicted data for the compressor with the inlet-adjustment mechanism respectively in the closed position and in the open position.

FIG. 5 is a map that superimposes the speed lines for the low-trim or closed position of FIG. 1, and the speed lines for the high-trim or open position of FIG. 2. It will be seen that for a given compressor speed, the respective low- and high-trim speed lines cross each other at a point denoted by a solid black circle in FIG. 5. This means that at the pressure ratio and corrected flow condition where the speed lines cross, the inlet-adjustment mechanism can be switched from one of its two positions to the other without there being any significant effect on the flow rate and pressure ratio of the compressor. Thus, for example, at the point labeled "A" in FIG. 5, the inlet-adjustment mechanism can be moved from the closed position to the open position, or from the open position to the closed position, with no significant effect on compressor behavior.

This characteristic speed-line crossing feature can be taken advantage of in designing the control scheme for controlling the operation of the inlet-adjustment mechanism. By establishing a "threshold" line TL on the superimposed maps in FIG. 5, representing a "best fit" of the speed-line crossing points, the operation of the inlet-adjustment mechanism can be regulated with reference to where on the compressor map the compressor is operating, and in particular where the operating point is located with respect to the threshold line. When the compressor is operating in a region located to the left of the threshold line TL in FIG. 5 (referred to as the low-flow side of the threshold line), the inlet-adjustment mechanism can be placed in the low-trim or closed position of FIG. 1. When the compressor is operating to the right of the threshold line, in the region denoted as the high-flow side of the threshold line, the inlet-adjustment mechanism can be placed in the high-trim or open position of FIG. 2. By switching between the closed and open positions when the operating point moves so as to cross the threshold line, the transition from one position to the other will not cause any sudden change in compressor flow rate and pressure ratio.

Implementation of the above-described control scheme can be accomplished in various ways. FIG. 6 illustrates the general architecture of a system for controlling the inlet-adjustment mechanism 30. An actuator 26 of suitable type is coupled to the inlet-adjustment mechanism. The actuator can operate on any of various principles; for example, the actuator can employ an electric motor, a pneumatic device, a hydraulic device, or the like, for imparting movement to the inlet-adjustment mechanism to move it between its closed and open positions. The actuator 26 is in communication with a control unit 40. The control unit includes a processor 50 (such as a microprocessor), a memory 60 (such as non-volatile ROM, PROM, EPROM, or EEPROM memory), and interfaces 70 for communicating with other devices in the system. The memory can be programmed (e.g., in hardware and/or firmware and/or software) with control instructions that are executed by the processor for carrying out the functions of the control unit.

In an embodiment, the engine includes an engine control unit or ECU such as present on vehicles such as automobiles and trucks. The ECU is an electronic control unit that may include hardware and/or software components configured to control various aspects of engine operation. In particular, the ECU may receive inputs from various engine sensors and turbocharger sensors and control various engine and turbocharger actuators. The engine sensors may be disposed at various points in the engine to measure or otherwise determine corresponding engine parameters. Examples of engine sensors may include a throttle position sensor, air temperature sensor, engine revolutions per minute (RPM) sensor, engine load sensor, accelerator pedal position sensor and/or others. The engine actuators may include various relays, solenoids, ignition coils, or other electrically operable devices that may be used to control corresponding engine parameters. The turbocharger sensors may include sensors for measuring turbocharger rotational speed, compressor inlet pressure, compressor discharge pressure, compressor corrected flow rate, and other parameters.

In an exemplary embodiment as shown in FIG. 6, the ECU 40 may include an antisurge control module for regulating the position of the inlet-adjustment mechanism 30. The antisurge control module may be any means such as a device or circuitry embodied in hardware, software or a combination of hardware and software that is configured to perform the corresponding functions of the antisurge control module as described herein. In some embodiments, the antisurge control module may be configured to augment ECU 20 capabilities with respect to surge prevention by identifying engine conditions under which action is to be taken for antisurge activity and with respect to taking or directing actions (e.g., via control of the actuator 26 for inlet-adjustment mechanism 30) with respect to antisurge activity. As such, in an exemplary embodiment, the antisurge control module may merely provide additional functionality to the ECU 40. However, in some embodiments, the antisurge control module may be a separate unit from the ECU (i.e., the control unit 40 shown in FIG. 6 may not comprise the ECU but may be in communication with the ECU).

The memory device 60 may include, for example, volatile and/or non-volatile memory. The memory device 60 may be configured to store information, data, applications, modules, instructions, or the like for enabling the apparatus to carry out various functions in accordance with exemplary embodiments of the present invention. For example, the memory device 60 could be configured to buffer input data for processing by the processor 50. Additionally or alternatively, the memory device 60 could be configured to store instructions corresponding to an application for execution by the processor 50.

The processor 50 may be a processor of the ECU or a co-processor or processor of a separate antisurge control module. The processor 50 may be embodied in a number of different ways. For example, the processor 50 may be embodied as a processing element, a coprocessor, a controller, or various other processing means or devices including integrated circuits such as, for example, an ASIC (application specific integrated circuit), FPGA (field programmable gate array) a hardware accelerator or the like. In an exemplary embodiment, the processor 50 may be configured to execute instructions stored in the memory device 60 or otherwise accessible to the processor 50. As such, whether configured by hardware or software methods, or by a combination thereof, the processor 50 may represent an entity capable of performing operations according to embodiments of the present invention while configured accordingly. Thus, for example, when the processor 50 is embodied as an ASIC, FPGA or the like, the processor 50 may be specifically configured hardware for conducting the operations described herein. Alternatively, as another example, when the processor 50 is embodied as an executor of software instructions, the instructions may specifically configure the processor 50, which may otherwise be a general-purpose processing element if not for the specific configuration provided by the instructions, to perform the algorithms and/or operations described herein. However, in some cases, the processor 50 may be a processor of a specific device (e.g., the ECU) adapted for employing embodiments of the present invention by further configuration of the processor 50 by instructions for performing the algorithms and/or operations described herein (e.g., by addition of the antisurge control module).

The memory 60 of the control unit stores a base compressor map such as the map corresponding to the open position of the inlet-adjustment mechanism as shown in of FIG. 3. The map can be stored in any of various forms such as a look-up table that includes the variables of corrected flow $W_c$ versus pressure ratio PR along a series of constant-speed lines N1, N2, N3, etc. The speeds can be the turbocharger speeds, Nt, or alternatively can be engine speeds, Ne. The following description assumes that engine speed is used, but it will be understood that turbocharger speed can be used instead of engine speed. The memory also stores the threshold line TL representing a curve-fit of speed-line crossing points derived in the manner previously described. The threshold line can be stored in any of various forms, such as a table of PR versus $W_c$ or a polynomial formula expressing PR as a function of $W_c$. Alternatively the threshold line can be represented by corrected flow $W_c$ versus engine speed Ne. The processor 50 receives inputs of compressor corrected flow rate $W_c$, engine speed Ne, and time rate of change of engine speed $\Delta Ne/\Delta t$. The flow rate, engine speed, and time rate of change of engine speed (also referred to as acceleration or deceleration) are continually sensed by suitable sensors and the sensed values are sent to the processor (e.g., at regular time-step intervals such as every 0.1 second or other suitably selected interval). The processor uses these sensed parameters to decide which position the inlet-adjustment mechanism should be placed in, and to decide when to switch from one position to the other, as further described below.

A method in accordance with a first embodiment of the invention is now explained with reference to FIGS. 5 and 7. The present invention addresses the challenge of how to ensure that the inlet-adjustment mechanism is switched from one position to the other at the proper location on the compressor map. Ideally, the switch would occur exactly on the threshold line TL. In practice, however, this can be challenging because the operating point can move quickly on the compressor map during certain operating situations of the internal combustion engine. For example, consider the situation when the vehicle driver fully depresses the accelerator pedal to pass another vehicle, and the engine is operating at a high-speed, high-flow condition, putting the operating point within the high-flow side of the threshold line in FIG. 5 (inlet-adjustment mechanism in the open position). Then, suppose the driver suddenly releases the accelerator pedal completely. Engine speed and flow rate will drop rapidly, causing the operating point to quickly move toward the threshold line on the map in FIG. 5. In such a scenario, if the controller waits until it senses the operating point is on the threshold line before initiating actuation of the inlet-adjustment mechanism, the mechanism will actually close too late because of the finite response time required for the actuator to move the mechanism from the open position to the closed position. The present invention provides methods for "anticipating" the crossing of the threshold line, so that the actuator can initiate the switch in advance of the operating point reaching the threshold line.

Thus, a first method of the invention is illustrated in FIGS. 5 and 7. The method entails using a "switch band" defined between a low-switch line LSL and a high-switch line HSL as shown in FIG. 5. The low-switch line is offset from the threshold line on the low-flow side thereof, and the high-switch line is offset from the threshold line on the high-flow side thereof. The two switch lines are fixed in position, and their locations can be stored in the controller memory in the same manner that the threshold line is stored (i.e., table look-up, curve fit, etc.). The width of the switch band is selected based primarily on two factors: (1) the response time Tr required for the actuator/mechanism to switch from one position to the other, and (2) the maximum anticipated rate at which the operating point can move on the compressor map. This can be understood by considering some hypothetical scenarios. In one scenario, the operating point moves only "quasi-statically" (i.e., very slowly), and the response time Tr is very short. In this case, the controller does not need to begin switching the mechanism from open to closed (or from closed to open) until the operating point is very closed to or substantially on the threshold line—or in other words, the switch band can be very narrow. At the other extreme, consider a scenario where the operating point can move very quickly along the compressor map, and the response time Tr is long. In this case, the controller must anticipate the operating point reaching the threshold line TL, and must begin switching the mechanism well before the operating point actually reaches the threshold line.

Those skilled in the art will realize that in the case of an electric motor-driven turbocharger (a so-called "e-turbo"), the switch band thus must be relatively wide, because e-turbos are capable of rapid acceleration and deceleration. Conventional exhaust-gas driven turbochargers, on the other hand, accelerate and decelerate more slowly, and hence the switch band can be narrower. Thus, the switch band is tailored to the particular engine/turbocharger system characteristics.

FIG. 7 is a flow diagram illustrating the first method in accordance with one embodiment of the invention. In a step 102, compressor corrected flow rate $W_c$, engine speed Ne, and time rate of change of engine speed $\Delta Ne/\Delta t$ are detected for the current operating point of the compressor, using suitable sensors as well-known in the art. In a decision step 104, it is determined based on these parameters whether the operating point (OP) is located on the -threshold line TL or on the high-flow side (to the right in FIG. 5) of the threshold line. If the answer to that query is "yes" (Y), the process proceeds to a decision step 106, which queries whether $\Delta Ne/\Delta t$ is greater than zero (i.e., the engine is accelerating). If the answer to that query is "yes", then the inlet-adjustment mechanism is left in the open position as indicated at 107 because the operating point is not moving toward the threshold line. On the other hand, if the answer to the decision step 106 is "no" (meaning the engine is not accelerating), then it is possible the operating point is moving toward the threshold line, so a further decision step 108 is executed, querying whether the operating point (OP) is on the high-switch line HSL. If the answer is "yes" then the inlet-adjustment mechanism is switched to the closed position as indicated at 109; otherwise if the OP is not on the HSL, the mechanism is left in the open position as indicated at 110.

If the decision step 104 has a "no" result (meaning the operating point is on the low-flow side of the threshold line), a decision step 112 is executed, querying whether $\Delta Ne/\Delta t$ is greater than zero (i.e., the engine is accelerating). If the answer is "no", the mechanism is closed (or is left in the closed position) as indicated at 113, because it means that the operating point is not moving toward the threshold line. If decision step 112 yields a "yes" result (i.e., the engine is accelerating), it means that the operating point is moving toward the threshold line. Thus, a further decision step 114 is executed, querying whether the operating point is on the low-switch line LSL. If the answer is "yes", then the mechanism is switched to the open position as indicated at 115; otherwise the mechanism is left closed as indicated at 116.

The process then returns to step 102 and the steps are repeated at regular time steps. At each time step, the detected operating parameters for the previous time step as well as for the current time step are remembered and compared. By suitably selecting the time step interval to be short enough relative to the anticipated maximum rate at which the flow rate through the compressor can change (and relative to the response time of the actuator/mechanism), it can be ensured that the inlet-adjustment mechanism is switched from one position to the other at or sufficiently near the threshold line such that the switch has no significant effect on the flow rate and pressure ratio. Thus, there is no sudden perceptible change in compressor performance when the switch occurs.

The method of the first embodiment thus generally entails steps of tracking, by detecting at periodic time intervals, movement of an operating point of the compressor on the compressor map; determining, at each said time interval, whether the operating point is on the high-flow side of the threshold line or is on a low-flow side of the threshold line; determining, at each said time interval, whether the operating point is moving toward the threshold line; and when the operating point is determined to be on the high-flow side of the threshold line and to be moving toward the threshold line, initiating actuation of the inlet-adjustment mechanism to switch from the open position to the closed position, wherein said initiating is begun before the operating point reaches the threshold line, and when the operating point is determined to be on the low-flow side of the threshold line and to be moving toward the threshold line, initiating actuation of the inlet-adjustment mechanism to switch from the closed position to the open position before the operating point reaches the threshold line. More particularly, the method of the first embodiment of the invention utilizes the fixed low-switch line LSL and the fixed high-switch line HSL in the decision whether and when to switch the mechanism from closed to open or from open to closed, respectively.

A second embodiment of the invention is now explained with reference to FIGS. 8 and 9. In the second embodiment, there is no fixed switch band as in the prior embodiment. On the compressor map of FIG. 8, the dotted line illustrates a scenario in which the operating point OP is moving toward the threshold line (i.e., to the left in FIG. 8). At the time instant represented by FIG. 8, however, the operating point is currently on the high-flow side of the threshold line TL. The method of the second embodiment generally entails instantaneously computing (i.e., predicting based on the distance D to the threshold line and the current speed at which the operating point is moving on the map) how long it will take for the operating point to reach the threshold line, said time period being denoted as $T_{TL}$ herein. That predicted time period is then compared to the response time Tr for the actuator/mechanism to switch positions, and said comparison is used for deciding whether and when to initiate the switch.

More particularly, with reference to FIG. 9, in a step 202, compressor corrected flow rate Wc, engine speed Ne, and time rate of change of engine speed $\Delta Ne/\Delta t$ are detected for the current operating point of the compressor, using suitable sensors as well-known in the art. At step 203, based on the detected parameters from step 202, the time $T_{TL}$ required for the operating point OP to move from its current location to the threshold line TL is calculated. In a decision step 204, it is determined based on the detected parameters whether the operating point (OP) is located on the threshold line TL or on the high-flow side (to the right in FIG. 8) of the threshold line. If the answer to that query is "yes" (Y), the process proceeds to a decision step 206, which queries whether $\Delta Ne/\Delta t$ is greater than zero (i.e., the engine is accelerating). If the answer to that query is "yes", then the inlet-adjustment mechanism is left in the open position as indicated at 207 because the operating point is not moving toward the threshold line. On the other hand, if the answer to the decision step 206 is "no" (meaning the engine is not accelerating), then it is possible the operating point is moving toward the threshold line, so a further decision step 208 is executed, querying whether the response time Tr is greater than or equal to the time $T_{TL}$ required for the operating point to reach the threshold line. If the answer is "yes" then the inlet-adjustment mechanism is switched to the closed position as indicated at 209; otherwise if Tr is not greater than or equal to $T_{TL}$, the mechanism is left in the open position as indicated at 210.

If the decision step 204 has a "no" result (meaning the operating point is on the low-flow side of the threshold line), a decision step 212 is executed, querying whether $\Delta Ne/\Delta t$ is greater than zero (i.e., the engine is accelerating). If the answer is "no", the mechanism is closed (or is left in the closed position) as indicated at 213, because it means that the operating point is not moving toward the threshold line. If decision step 212 yields a "yes" result (i.e., the engine is accelerating), it means that the operating point is moving toward the threshold line. Thus, a further decision step 214 is executed, querying whether the response time Tr is greater than or equal to the time $T_{TL}$ required for the operating point to reach the threshold line. If the answer is "yes", then the mechanism is switched to the open position as indicated at 215; otherwise the mechanism is left closed as indicated at 216.

In the embodiments described above, it is assumed that acceleration or deceleration is determined based on time rate of change of engine speed $\Delta Ne/\Delta t$. Alternatively, however, the time rate of change of turbocharger speed $\Delta Nt/\Delta t$ can be used instead. Yet another alternative is to use the time rate of change of corrected compressor flow $\Delta Wc/\Delta t$. Similarly, the location of the operating point on the map can be determined based on Wc and engine speed Ne, or based on Wc and turbocharger speed Nt.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for controlling a compressor inlet-adjustment mechanism disposed in an air inlet of a centrifugal compressor of a turbocharger for boosting intake pressure of an internal combustion engine, the inlet-adjustment mechanism being actuatable to switch between a closed position that reduces a flow area of the air inlet and an open position that increases the flow area of the air inlet, the method comprising:

identifying a threshold line on a compressor map of pressure ratio PR versus corrected flow rate $W_c$ for the compressor, the threshold line being a line at which the inlet-adjustment mechanism is to be moved from the open position to the closed position when an operating point of the compressor on the compressor map reaches the threshold line under a condition of quasi-static movement of the operating point, starting from a high-flow side of the threshold line;

tracking, by detecting at periodic time intervals, movement of an operating point of the compressor on the compressor map;

determining, at each said time interval, whether the operating point is on the high-flow side of the threshold line or is on a low-flow side of the threshold line;

determining, at each said time interval, whether the operating point is moving toward the threshold line;

when the operating point is determined to be on the high-flow side of the threshold line and to be moving toward the threshold line, initiating actuation of the inlet-adjustment mechanism to switch from the open position to the closed position, wherein said initiating is begun before the operating point reaches the threshold line; and when the operating point is determined to be on the low-flow side of the threshold line and to be moving toward the threshold line, initiating actuation of the inlet-adjustment mechanism to switch from the closed position to the open position before the operating point reaches the threshold line, the method further comprising:

at each said time interval, calculating a time rate of change $\Delta Q/\Delta t$, where Q is one of speed of the engine Ne, speed of the turbocharger Nt, and flow rate of the compressor Wc;

at each said time interval, calculating a distance D between the operating point and the threshold line on the compressor map;

at each said time interval, calculating, based on said distance D and said time rate of change $\Delta Q/\Delta t$, a time period $T_{TL}$ it will take for the operating point to reach the threshold line; and at each said time interval, making a comparison between said time period $T_{TL}$ and a known response time Tr for the inlet-adjustment mechanism to transition between the open and closed positions;

wherein the step of initiating actuation of the inlet-adjustment mechanism is performed based on said comparison.

2. The method of claim 1, wherein the step of initiating actuation of the inlet-adjustment mechanism is performed when said time period $T_{TL}$ is approximately equal to the response time Tr.

3. A computer program product comprising at least one computer-readable storage medium having computer-executable program code instructions stored therein for controlling a compressor inlet-adjustment mechanism disposed in an air inlet of a centrifugal compressor of a turbocharger for boosting intake pressure of an internal combustion engine, the inlet-adjustment mechanism being actuatable to switch between a closed position that reduces a flow area of the air inlet and an open position that increases the flow area of the air inlet, the compressor having a compressor map of pressure ratio PR versus corrected flow rate Wc for the compressor, the compressor map including a threshold line at which the inlet-adjustment mechanism is to be moved from the open position to the closed position when an operating point of the compressor on the compressor map reaches the threshold line under a condition of quasi-static movement of the operating point, starting from a high-flow side of the threshold line, the computer-executable program code instructions comprising:

program code instructions for tracking, by detecting at periodic time intervals, movement of an operating point of the compressor on the compressor map;

program code instructions for determining, at each said time interval, whether the operating point is on the high-flow side of the threshold line or is on a low-flow side of the threshold line;

program code instructions for determining, at each said time interval, whether the operating point is moving toward the threshold line;

program code instructions for, in response to a determination that the operating point is on the high-flow side of the threshold line and is moving toward the threshold line, initiating actuation of the inlet-adjustment mechanism to switch from the open position to the closed position, wherein said initiating is begun before the operating point reaches the threshold line; and program code instructions for, in response to a determination that the operating point is on the low-flow side of the threshold line and is moving toward the threshold line, initiating actuation of the inlet-adjustment mechanism to switch from the closed position to the open position before the operating point reaches the threshold line, the computer program product further comprising:

program code instructions for, at each said time interval, calculating a time rate of change $\Delta Q/\Delta t$, where Q is one of speed of the engine Ne, speed of the turbocharger Nt, and flow rate of the compressor Wc;

program code instructions for, at each said time interval, calculating a distance D between the operating point and the threshold line on the compressor map;

program code instructions for, at each said time interval, calculating, based on said distance D and said time rate of change $\Delta Q/\Delta t$, a time period $T_{TL}$ it will take for the operating point to reach the threshold line; and program code instructions for, at each said time interval, making a comparison between said time period $T_{TL}$ and a known response time Tr for the inlet-adjustment mechanism to transition between the open and closed positions, and initiating actuation of the inlet-adjustment mechanism based on said comparison.

4. The computer program product of claim 3, wherein the step of initiating actuation of the inlet-adjustment mechanism is performed when said time period $T_{TL}$ is approximately equal to the response time Tr.

* * * * *